April 1, 1952   E. W. HOBBS   2,591,260
SPRING-DRIVEN MOTOR
Filed May 27, 1948
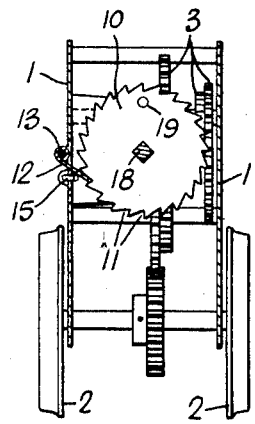
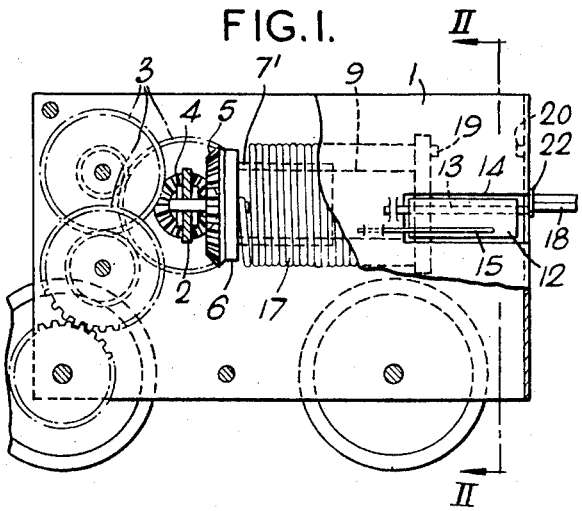
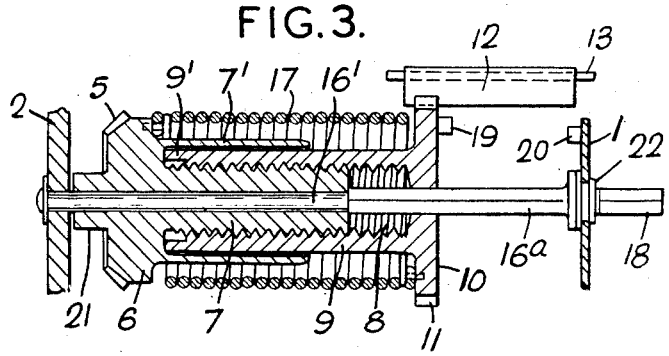
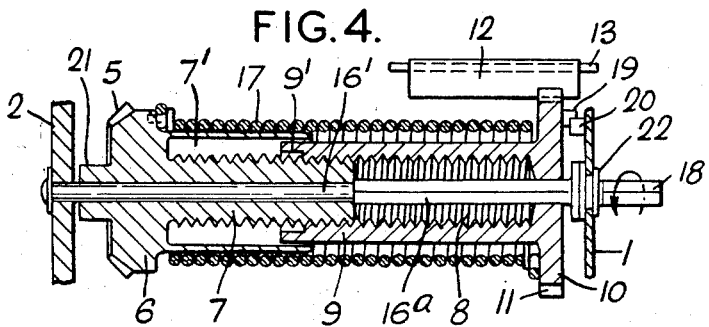
INVENTOR
EDWARD W. HOBBS
BY Hazeltine, Lake & Co.
AGENTS Patented Apr. 1, 1952

2,591,260

UNITED STATES PATENT OFFICE 2,591,260

SPRING-DRIVEN MOTOR

Edward Walter Hobbs, Rickmansworth, England

Application May 27, 1948, Serial No. 29,524
In Great Britain March 19, 1948

8 Claims. (Cl. 185—37)

This invention relates to spring driven motors using drawn steel wire of the type frequently known as "piano" wire, for the purpose of activating a mechanism, colloquially known as a "clockwork" motor.

It is well known that wire springs coiled in the form of a helix have been used in a rudimentary form as a torsion spring to provide energy for actuating toys and other devices. In such an application one end of the coiled spring is connected to a driving gear or directly to the member to be driven, the said member being adapted to rotate co-axially with the spring.

The other end of the spring is adapted to be rotated manually about the axis of the spring and is provided with a ratchet or other detent to prevent reverse rotation of the spring. In such arrangements the spring is long relative to its diameter and when held at the driving end but rotated at the driven end the torque so applied is taken up by the coils of the spring and stored until the detent is removed whereupon the stored energy is applied to the driving gear or driven member which is rotated thereby.

Defects of this simple form of spring motor includes serious limitation of application due to the length to diameter ratio, and more particularly to severe end thrusts imposed by the variations in length of the spring and the tension thereof when the spring is coiled or uncoiled.

Furthermore, when the coil spring is wound up its length increases and its diameter decreases, but it is only possible to make a relatively small number of turns because the spring has a side thrust imposed upon it due to the pitch angle of the helix, with the result that an unbalanced force is present in the spring which sets up a sinuous motion with marked nodal points, and if the spring be further rotated it will assume a roughly ellipsoidal form or a series of such forms, and under this condition, when released, it will lose much of its energy in unforming the ellipsoidal or like coil or coils and deliver very little of its energy as axial rotation.

The object of this invention is to obviate, or considerably minimise, the aforesaid disadvantages, so that it is practicable to utilize a simple helical coil of spring wire as an energy providing agent for driving mechanisms of may kinds.

According to the present invention a spring motor of the type employing a helical torsion spring secured at its ends to anchorage members and adapted to be wound about its axis to store up energy therein, so that upon its release it will reassert itself to drive one of said anchorage members about such axis is characterised in that means is provided to produce during the winding and unwinding of the spring simultaneous predetermined relative axial displacement of said anchorage members at a rate complementary with the change in diameter of the spring so that the axial dimension of the spring is positively progressively varied during its rotation.

In order that the invention may be clearly understood and readily carried into effect, drawings are appended hereto illustrating an embodiment thereof suitable for use with a clockwork toy, and wherein, Figure 1 is a side elevation of part of a wheeled toy with a portion of a side frame member thereof removed to partially expose the spring motor.

Figure 2 is a section on the line II—II of Figure 1.

Figure 3 is a sectional elevation taken along the axis of the motor and showing the spring unloaded, and Figure 4 shows the spring motor of Figure 3 in the fully wound state.

Referring to the drawings, the spring motor is shown housed within a box-like frame 1 of a toy having wheels 2 driven from the spring motor via a train of gear wheels 3, an input element of which train is formed with bevel teeth 4 meshing with bevel teeth 5 on an anchorage member 6 formed as an enlarged or flanged head of a screw 7 threaded into the threaded bore 8 of a co-axial sleeve 9 having at its end remote from the aforesaid head 6 a flange taking the form of a ratchet wheel 10, the ratchet wheel on the periphery of which co-operates with a longitudinal pawl in the form of an elongated oblong resilient blade 12 which can be deformed from the plane of one of the side panels of the frame 1, or as shown, can comprise an elongated oblong strip threaded upon a parallel supporting rod 13 suitably fixed to the appropriate side panel of the frame 1, the pawl being located freely within an aperture 14 in the said side panel and urged against its longitudinal free edge by a spring 15 against the toothed periphery of the ratchet wheel.

The screw 7 is formed with an integral cylindrical skirt 7' slidable upon the aforesaid sleeve 9, and this skirt 7' acts as a partial core member for a helical spring 17 when the spring is in its predetermined fully wound state as shown in Figure 4 so as to obviate a gap between the contiguous ends of the sleeve 9 and skirt 7' and also to afford adequate support for the spring.

The ends of the spring are anchored to a pair of anchorage members constituted by the heads 6 and 10 of the screw 7 and sleeve 9 respectively and the pitch of the thread of the screw 9 and the sleeve 8 corresponds with the pitch of the spring, this pitch being maintained constant in the spring throughout its full range of operation. Hence, the spring will not be deformed out of its cylindrical form e. g. into substantially ellipsoidal or other non-cylindrical configuration, or strained axially so as to increase the separation of the convolutions, whereby loss of effective energy due to this deformation and straining is obviated when the spring reasserts itself.

The screw 7 and barrel 9 are supported upon a central arbor 16 having a cylindrical end part 16' engaged in a corresponding bore of the screw 7 and a splined or non-cylindrical part 16a sliding through a corresponding aperture in the end of the barrel 8 this arbor being journalled in bearings 22 in the frame 1 and having a key or crank receiving end part 18 for loading the spring.

The proportions of the spring 17 are such that in the inert state shown in Figure 3, it just fits between the ratchet member 10 and the head 6 when the two are screwed together by relative rotation of one about the other. If now the screw 7 or first motion wheel constituting the head 6 be prevented from rotation, and the central arbor 16 is rotated the spring is wound up, and increases in length, but at the same time the ratchet member 10 is moved lengthways on the arbor by reason of the inter-action of the screw 7 and the threaded barrel or sleeve 9.

The spring is thus fully wound up by rotating the ratchet member 10 and associated barrel 9 the requisite number of turns so that when fully wound up the ratchet member 10 will have traversed the squared or driving part 16a of the arbor to the limit of its travel as shown in Figure 4, and the spring will still fill the space between the end members 6 and 10.

The pawl 12 now operates to prevent contra-rotation of the spring, but upon releasing the member 6 or first motion wheel, the energy of the spring is released and rotates the circular member but the ratchet member 10 does not rotate, consequently the screwed portions 6 and 8 operate to draw the ratchet lengthways on the arbor in conformity with the shortening of the spring until the original inert state is reached.

Since the act of winding up the spring is to unscrew the ratchet member 10 from the cooperative screw 7, it is desirable to provide an overwind preventing device which can take the form of a projection 19 on the outer face of the ratchet member 10 so placed that at the last turn but one—when winding up, it will just clear an abutment 20 on the main framework, but upon the completion of the last winding up turn and the axial movement of the ratchet disc the projection will be opposed by the fixed abutment on the frame and further rotation of the ratchet member will be prevented.

The screw 7 is held against axial displacement by a boss 21 at one end abutting against the frame 1 and by its other end abutting against the inner end of the non-cylindrical part 16a of the arbor 16. If desired thrust bearings can be provided at these ends when the motor is designed for high class or heavy duty work, the motor shown in the drawings being of simple form suitable for use with inexpensive toys and the like. Also if desired the spring may be a multiple-start spring instead of a single length of wire as shown.

It is preferred for the barrel 9 to be prolonged beyond its threaded bore as at 9' to abut against the opposed annular face of the head 6, as shown in Figure 3, when the spring is in its released state. Also it is of advantage to slightly preload the spring when assembling the motor in order that an effective driving force is stored up in the spring before the "winding up" commences.

I claim:

1. A spring motor comprising a helical torsion spring, a pair of rotary anchorage members to which the ends of the spring are secured, an input driver to drive rotatably one of said anchorage members relative to the other so as to store up energy in the spring, and feed screw means connected across the said two members, said feed screw means having a pitch the same as that of the said helical spring, so that during said driving of one anchorage member relative to the other it produces a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof.

2. A spring motor comprising a helical torsion spring, a pair of rotary anchorage members to which the ends of the spring are secured, an input driver extending axially idly within one of said anchorage members and positively within the other to drive the latter member relative to the other so as to store up energy in the spring, a feed screw fixed co-axially to one of said members and threaded into the other member to produce during the loading of the spring, due to the aforesaid driving of one anchorage member relative to the other, axial separation of the two anchorage members, said feed screw having a pitch which separates said two members at a rate which is always at a fixed ratio to the rate of change in diameter of the spring so as to cause the spring to contract its diameter uniformly throughout its effective length during loading whilst maintaining a uniform pitch of the convolutions thereof.

3. A spring motor comprising a helical torsion spring, a pair of co-axial rotary anchorage members to which the ends of the spring are secured, an input arbor positively connected to only one of said members so as to drive it relative to the other member to store up energy in the spring, a feed screw extending fixedly concentrically from the latter anchorage member, and a barrel threaded onto said screw and fixed concentrically at one end to the other anchorage member, said interengaging screw and barrel having a thread-pitch which produces during the loading of the spring by rotating one anchorage member relative to the other a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof.

4. A spring motor comprising a helical torsion spring, a pair of rotary anchorage members to which the ends of the spring are secured, an input driver to drive one of said anchorage members relative to the other so as to store up energy in the spring, feed screw means connected across the said two members, said feed screw means having a pitch such that during driving of one anchorage member relative to the other it produces a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof, a frame carrying the foregoing mechanism, an abutment on the anchorage member driven by said input driver, and an abutment fixed relative to said frame engaged by the aforesaid abutment to prevent further winding of the spring when a predetermined separation of the two anchorage members is reached.

5. A spring motor comprising a helical torsion spring, a pair of rotary anchorage members to which the ends of the spring are secured, an input driver to drive one of said anchorage members uni-directionally relative to the other so as to store up energy in the spring, a stop device with said uni-directionally driven member preventing counter-rotation of said member, and feed screw means connected across the said two members, said feed screw means having a pitch the same as that of the said helical spring, so that during driving of one anchorage member relative to the other it produces a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof.

6. A spring motor comprising a helical torsion spring, a pair of rotary anchorage members to which the ends of the spring are secured, a frame, an input arbor rotatable in said frame and passing axially through said members and rotatable idly relative to one of said anchorage members and positively connected to the other anchorage member to drive it uni-directionally so as to store up energy in the spring, a stop device with said uni-directionally driven anchorage member preventing counter-rotatiaon of such member, a feed screw extending fixedly concentrically from one anchorage member, and a barrel threaded onto said screw and fixed concentrically at one end to the other anchorage member, said inter-engaging screw and barrel having a thread-pitch which produces during the loading of the spring by rotating one anchorage member relative to the other a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof.

7. A spring motor comprising a frame, a pair of anchorage members and a helical spring carried within the frame and secured at its ends to said anchorage members, means to rotate one of said members to wind said spring about its axis to store up energy therein, so that upon its release it will reassert itself to drive the other one of said anchorage members about such axis, a screw in relatively fixed axial prolongation of one of said anchorage members, an internally threaded barrel in relatively fixed axial prolongation of the other anchorage member and having threaded permanently therein said screw, said spring being disposed concentrically about the axis of the screw and barrel, and a uni-directionally operating stop device in permanent operative engagement with the anchorage member which is rotated for loading the spring and which holds such anchorage member against counter-rotation, said inter-engaging screw and barrel having a thread-pitch which produces during the loading of the spring by rotating one anchorage member relative to the other a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof.

8. A spring motor comprising a frame, a pair of anchorage members and a helical spring carried within the frame and secured at its ends to said anchorage members, means to rotate one of said members to wind said spring about its axis to store up energy therein, so that upon its release it will reassert itself to drive the other one of said anchorage members about such axis, a screw in relatively fixed axial prolongation of one of said anchorage members, a barrel in relatively fixed axial prolongation of the other anchorage member and threaded internally to accommodate said screw, said screw being in permanent threaded engagement with the threaded bore of the barrel, said spring being disposed concentrically about the axis of the screw and barrel, and a uni-directionally operating stop device in permanent operative engagement with the anchorage member which is rotated for loading the spring and which holds such anchorage member against counter-rotation, said uni-directionally operating stop device comprising a ratchet wheel rotatable in unison with said associated anchorage member and an elongated pawl engaging the ratchet teeth and having a length greater than the length of axial travel of said associated anchorage member, said interengaging screw and barrel having a thread-pitch which produces during the loading of the spring by rotating one anchorage member relative to the other a controlled axial separation of the two anchorage members at a rate which is always at a fixed ratio to the rate of change in diameter of the spring so as to cause the spring to contract its diameter uniformly throughout its effective length during loading whilst maintaining a uniform pitch of the convolutions thereof.

EDWARD WALTER HOBBS.

REFERENCES CITED

The following references are of record in the file of this patent:

UNITED STATES PATENTS

| Number | Name | Date |
|---|---|---|
| 1,127,134 | Wehinger | Feb. 2, 1915 |

FOREIGN PATENTS

| Number | Country | Date |
|---|---|---|
| 495,086 | Germany | June 22, 1928 |